United States Patent [19]

Derr et al.

[11] 4,346,229

[45] Aug. 24, 1982

[54] REACTION PRODUCTS OF DMT PROCESS RESIDUE AND DIPROPYLENE GLYCOL

[75] Inventors: Leighton K. Derr, Aurora, Ill.; Lyle B. Hawkins, Wilmington; Marlene J. Jones, New Castle, both of Del.

[73] Assignee: Hercules Incorporated, Wilmington, Del.

[21] Appl. No.: 145,515

[22] Filed: May 1, 1980

[51] Int. Cl.$^3$ .................... C07C 69/773; C07C 69/76
[52] U.S. Cl. ...................................... 560/91; 521/172; 560/94
[58] Field of Search .................................. 560/91, 94

[56] References Cited

U.S. PATENT DOCUMENTS

| | | | |
|---|---|---|---|
| 3,647,759 | 3/1972 | Walker | 560/91 X |
| 3,655,820 | 4/1972 | Kaupp | 560/91 X |
| 3,892,796 | 7/1975 | Liebfried | 560/91 |
| 4,039,487 | 8/1977 | Kolskowski et al. | 560/91 X |
| 4,112,240 | 9/1978 | Hulsmann et al. | 560/77 |
| 4,237,238 | 12/1980 | DeGuiseppi et al. | 521/131 |

*Primary Examiner*—Natalie Trousof
*Assistant Examiner*—Vera C. Clarke
*Attorney, Agent, or Firm*—Hazel L. Deming

[57] ABSTRACT

Described is a process for producing unique reaction products from DMT process residue. In the process of this invention DMT process residue is reacted with an excess of dipropylene glycol to give normally liquid, aromatic polyester polyols which are compatible with Freon 11 blowing agent and with glycerol and hence have outstanding utility in the production of blown polyurethane and polyisocyanurate-polyurethane foams.

2 Claims, No Drawings

REACTION PRODUCTS OF DMT PROCESS RESIDUE AND DIPROPYLENE GLYCOL

This invention relates to synthetic resins produced from the residues from the commercial process for producing dimethyl terephthalate (DMT) from p-xylene by oxidation, esterification and distillation of the DMT from the reaction mixture, and particularly to the normally liquid aromatic polyester polyols which are obtained by the transesterification reaction of DMT process residue with an excess of dipropylene glycol.

Dimethyl terephthalate (DMT) is produced commercially by a continuous process in which p-xylene is air oxidized to p-toluic acid, the toluic acid is esterified with methanol to form methyl p-toluate, which is air oxidized to the monomethyl ester of terephthalic acid, and the monomethyl ester is further esterified with methanol to form DMT. In one commercial process the air oxidations are carried out together in one stage, the esterifications are performed together in another stage, and the esterification product is distilled to give a distillate comprising DMT and methyl p-toluate, and an esterified-oxidate residue. The DMT and methyl p-toluate are separated, the DMT is recovered and methyl p-toluate is returned to the oxidation stage. The esterified-oxidate residue which remains can be directly purged from the process or a portion of the residue can be recycled to the oxidation stage and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

DMT process residue is a tar like or solid material composed of a highly complex mixture of high molecular weight monomeric and polymeric constituents, included among which are the methyl and benzyl esters of biphenyl and triphenyl dicarboxylic and tricarboxylic acids. The residue at 25° C. has the following typical ranges of properties:

| | |
| --- | --- |
| Color | Dark brown |
| Drop Softening Point[1] | 10-140° C. |
| Acid Number (ASTM D1639, neutral chloroform solvent) | 10-110 |
| Methoxyl in COOCH$_3$ (ASTM D-1166-60) | 7-30% by weight |
| DMT | 0-20% by weight |
| Saponification Number[2] | 375-500 |

[1]Hercules drop softening point method as described on page 12 of a booklet titled "Wood Rosins, Modified Rosins and Related Resins", published in 1963 by Hercules Powder Company now by change of name Hercules Incorporated.
[2]Anal. Chem. 23, 1126 (1951)

In the past DMT process residue has been disposed of largely by incineration or the like because it appeared to have only limited commercial utility. However, at present day rates of production of DMT, the quantity of residue obtained is substantial and economically significant and efforts have been directed to processes for converting the residue to a commercially useful product. One such process is described by Walker in U.S. Pat. No. 3,647,759 and concerns transesterifying the esterified-oxidate residue from the DMT process with ethylene glycol to form resins which are said to be useful as binders for wood or mineral fiber composites or as polyol reactants for reaction with polyisocyanate material in the production of polyurethane foams, coatings and films. The transesterification products of DMT process residue with ethylene glycol are normally solid or balsamic, are not compatible with Freon 11 (trichlorofluoromethane blowing agent) and cannot be used as the sole polyol in Freon-blown foam systems. The transesterification products are also not compatible with higher functional polyols such as glycerol, and hence are not useful in systems requiring a polyol functionality greater than 2 in order to increase crosslink density of foams or to provide spray systems at a 1:1 by volume ratio. The incompatibility problem with Freon 11 can be improved by blending the ethylene glycol transesterification product with certain copolyols or by using blends of Freon 11 with varying percentages of methylene chloride. Compatibility with Freon 11, however, usually requires at least twice as much copolyol as transesterification product and, while blends of Freon 11 with methylene chloride are generally quite compatible with the transesterification products alone, the blends cause shrinkage in foams and hence severely limit utility.

Another process is described by Kaupp in U.S. Pat. No. 3,655,820 and relates to forming unsaturated polyester resins which can be cured with styrene to give materials having high flexural and impact strength from a distillate obtained from DMT process residue. In Kaupp's patent, DMT process residue is distilled under vacuum to provide a specified distillate, the distillate is transesterified with an excess of a polyhydric alcohol and the resulting hydroxyl-terminated ester is esterified with maleic acid or its anhydride to form an unsaturated polyester. Yet another process is described by Leibfried in U.S. Pat. No. 3,892,796 and concerns hydrogenating DMT process residue or distilled DMT process residue to substantially complete ring saturation to give a hydrogenated material which can then be reacted with polyhydric alcohols to give polyols useful as plasticizers or for reaction with isocyanates to give polyurethane end products. Liebfried's hydrogenated materials, as well as the polyols therefrom, however, are cycloaliphatic in nature and hence have limited utility in systems where aromaticity is desired to improve flame retardancy, compressive strength and temperature stability. Thus, the need to find uses for DMT process residue is art recognized and the search continues.

Now in accordance with this invention it has been found that unique synthetic resins can be produced by reacting DMT process residue with an excess of dipropylene glycol and that the reaction products exhibit outstanding properties as compared with the resins produced with other glycols such as ethylene glycol, diethylene glycol, propylene glycol, 1,4-butane diol, neopentyl glycol and 1,6-hexanediol, have broad utility in conventional polyurethane foam systems, can be used as a portion of or the sole polyol component in foam systems containing chemical and/or physical blowing agents such as water, azo compounds and/or trichlorofluoromethane, methylene chloride, low boiling alkanes, carbon dioxide and the like and provide systems having excellent shelf stability for extended periods of time. Additionally, foamed products produced from the products of this invention have, at low, normal or high density, excellent compressive strength, improved flame retardancy and outstanding resistance to humid aging and have at low density excellent thermal insulating properties.

Accordingly, the present invention relates to a process for producing normally liquid aromatic polyester polyols which are compatible with trichlorofluoromethane and glycerol from DMT process residue by reacting DMT process residue with a quantity of dipropylene glycol or a mixture thereof with up to 50% by weight of one or more different glycols, in moles, in excess of the number of equivalents of available acid and methyl ester present in the residue, as indicated by the acid number and the methoxyl content of the residue, to the products so produced and to the use of the products in the production of polyurethane and polyisocyanurate-polyurethane foams.

The process of this invention is effected by mixing the residue with the excess of dipropylene glycol or a dipropylene glycol mixture containing up to 50% by weight of the mixture of a different glycol or glycols such as ethylene glycol, 1,2-propanediol, 1,3- or 1,4-butanediol, neopentyl glycol, hexanediol and diethylene glycol, and establishing and maintaining the resulting mixture at an elevated temperature for a period of time sufficient for substantially complete reaction. The amount of dipropylene glycol or its mixture used is not critical, provided that the quantity is sufficient to provide greater than 1 mole per equivalent of available acid and methyl ester present in the residue. Preferably from 1.25 to 10 moles, and more preferably from 1.4 to 4 moles, are recommended per equivalent of available acid and methyl ester. Larger amounts, of course, are not ruled out, but since additional advantages are not usually realized thereby, amounts greater than about 10 moles per equivalent of acid and methyl ester are not recommended.

The reaction results in transesterification and esterification of the methyl ester and acid components respectively of the residue and provides an ester product having hydroxyl termination at one end. The DMT process residue may in some cases contain a catalyst which was used to promote the oxidation and esterification reaction in the DMT process. To the extent that such catalysts are effective for transesterification, their presence will promote the present reaction. However, if such a catalyst has been removed or the amount thereof is not sufficient to act as a transesterification catalyst, a sufficient quantity of a conventional transesterification catalyst such as zinc, calcium or magnesium acetate, tin salts or esters, titanium esters and the like is preferably added to the mixture to provide a catalytic quantity of transesterification catalyst.

The temperature range in which reaction is effected is generally from about 150° to about 275° C. However, lower and higher operating temperatures are within the broader concepts of this invention. The period of time sufficient for complete reaction is generally in a range from about 1 to about 24 hours and usually from about 2 to about 12 hours. Of course, the higher the reaction temperature the shorter the time required for substantially complete reaction. Shorter and longer periods of time to effect substantially complete reaction are within the broader aspects of this invention. Reaction is considered to be substantially complete when the formation of methanol appears to cease.

Generally the reaction is performed in the absence of a liquid reaction medium composed of material other than dipropylene glycol or its mixture and DMT process residue. However, the presence of liquid reaction medium composed of material other than the reactants is within the broader concepts of this invention.

Preferably, while the reaction is taking place, methanol and any water formed in the reaction are removed from the reaction vessel. Any dipropylene glycol removed with the methanol is preferably returned to the reaction mixture.

Upon completion of the reaction, the reaction product is recovered and, if desired, unreacted dipropylene glycol is removed from the reaction mixture, as by vacuum distillation. Usually, it is advantageous to retain up to about 25% of unreacted dipropylene glycol in the product to modify the viscosity and provide additional hydroxyl functionality. Amounts in excess of about 25% are not generally advantageous because of the dilution effect.

The reaction product is a normally liquid, aromatic polyester polyol. The ranges of typical properties of specific embodiments of the product are:

| State at 25° C. | Liquid |
| Viscosity at 25° C. | 50-500 poises |
| Color | Dark brown |
| Acid Number | 1-10 |
| Hydroxyl content (% by weight) | 7.5-15 |
| Methoxyl in COOCH$_3$ | 0-5% by weight |

The reaction products obtained by the practice of the process of the invention can be used as part or as all of the polyol reactant in conventional reactions but has particularly unique utility for reaction with polyisocyanates to form polyurethane and polyisocyanurate foams, coatings, films and the like and are particularly useful in foam formulations containing glycerol and/or physical blowing agents such as Freon 11.

The best mode now contemplated of carrying out this invention is illustrated by the following examples of specific embodiments thereof. This invention is not limited to these specific embodiments. In the examples all parts by weight are designated by "w" and all percentages are by weight.

EXAMPLE 1

DMT process residue (6500 w), having such typical properties as Molecular Weight=325; Drop softening point=41° C.; Acid number=28; Saponification number=466; Methoxyl=18.7%; and DMT=3.4% was introduced into a reactor fitted with a stirrer and a fractional distillation column, and heated until fluid enough to stir readily. While stirring the residue, dipropylene glycol (8608 w) was added, and then titanium ester catalyst (9.18 w) was added. The resulting mixture was established and maintained for 12 hours at 210°-220° C., while a distillate consisting essentially of methanol and water was removed. The mixture contained 1.5 moles of dipropylene glycol per equivalent of acid plus methyl ester. At the end of the 12 hour period, the reaction product had an acid number of 3 and a methoxyl content of 0.4%. Heating was then terminated and the resulting mixture was cooled. The resinous product had a viscosity of 130 poises at 25° C., a hydroxyl content (ASTM E222 Method B) of 9.7%, and a free dipropylene content of 21.6%. The resin was compatible with trichlorofluoromethane (Freon 11) at resin:Freon ratios of 2:1 to 5:1 and with glycerol at resin:glycerol ratios of 1:1 to 20:1 (no phase separation after 5 days).

EXAMPLE 2

The procedure of Example 1 was repeated except that 2185 w of DMT process residue having the same typical properties as the residue of Example 1, 6000 w of dipropylene glycol and 1.8 w of catalyst were used and, following cooling of the reaction mixture, the mixture was vacuum distilled at 130°–135° C. under 1–3 mm. pressure to remove unreacted dipropylene glycol. The reaction mixture of this example contained 3.15 moles of dipropylene glycol per equivalent of acid plus methyl ester. The resulting product had a viscosity of 409 poises at 25° C., an acid number of 2.4, a hydroxyl content of 8.5%, and a free dipropylene glycol content of 10.5%. It was compatible with Freon 11 and glycerol at the ratios given in Example 1.

EXAMPLE 3

The procedure of Example 2 was repeated except that 3278 w of DMT process residue having the same typical properties as the residue of Example 1, and 9000 w of dipropylene glycol were used, 2.05 w of zinc oxide were substituted for the 1.8 w of titanium ester catalyst and the reaction was carried out for 11 hours at 230°–240° C. The resulting product had a viscosity of 404 poises at 25° C., an acid number of 1.8, a hydroxyl content of 9.0%, a free dipropylene glycol content of 8.5%, and was compatible with Freon 11 and glycerol at the ratios given in Example 1.

EXAMPLE 4

The procedure of Example 2 was repeated except that 750 w of DMT process residue having the same typical properties as the residue of Example 1, 431.5 w of propylene glycol, 1294.5 w of dipropylene glycol and 0.47 w of zinc oxide were used and the reaction was carried out for 8 hours. The resulting product had a viscosity of 826 poises, an acid number of 3.70, a hydroxyl content of 9.6%, a free propylene glycol content of 1.4%, a free dipropylene glycol content of 9.6% and was compatible with Freon 11 at a resin:Freon ratio of 7:3.

EXAMPLE 5

The procedure of Example 4 was repeated except that 743.85 w of propylene glycol and 743.85 w of dipropylene glycol were used and the reaction was carried out for 7 hours. The resulting product had a viscosity of 1117 poises, an acid number of 2.5, a hydroxyl content of 10.8%, a free propylene glycol content of 1.3%, a free dipropylene glycol content of 14.2% and was compatible with Freon 11 at a resin:Freon ratio of 7:3.

EXAMPLES 6–8

These examples illustrate the use of the products of Examples 1 to 3 in the preparation of rigid polyurethane foams.

A quantity (262 to 300 w) of the products of Examples 1 to 3 (1.5 OH equivalents) was mixed with 40 w, (0.5 OH equivalency) of Niax LA-700, an amine based polyol, 62 w (0.5 OH equivalency) of Fyrol 6, a flame retardant hydroxy-terminated phosphonate ester, 7–8 w of a silicone surfactant, 0.5 w of Polycat 8, an amine catalyst, and 5.4 w of water until a uniform mixture was formed. Next, a quantity (100 to 103 w) of trichlorofluoromethane (Freon 11 blowing agent) was blended with the mixture, following which time 460 w (3.28 NCO equivalency) of polymethylene polyphenyl diisocyanate were added to the blend, and the resulting mixture was stirred vigorously for 15 seconds. The mixture was then quickly poured into a mold and permitted to foam. The result was a rigid polyurethane foam.

Specific details of these examples and properties of the resulting foams are reported in the Table below.

TABLE

| | Ex. 4 | Ex. 5 | Ex. 6 |
|---|---|---|---|
| Components | | | |
| Resinous Product | | | |
| Ex. 1, parts | 262.5 | | |
| Ex. 2, parts | | 300 | |
| Ex. 3, parts | | | 285 |
| Freon 11 | 101 | 100 | 103 |
| Foam Properties | | | |
| Friability[1] | none | none | none |
| Compressive strength, psi (ASTM D-1621 at 10% deflection, parallel to rise) | 30 | 30 | 43 |
| Oxygen Index, % $O_2$ by volume (ASTM D-2863) | 24 | 24 | 25.2 |
| Density, lbs./ft.$^3$ | 2.0 | 2.3 | 2.15 |
| Humid Aging, vol % increase (ASTM D-2126 at 158° F., 95–100% relative humidity) | | | |
| 24 hours | 6.6 | 6.2 | 5.7 |
| 7 days | 9.2 | 10.2 | 9.3 |
| 14 days | 12.1 | 12.5 | 11.3 |

[1]subjective

EXAMPLE 9

This example illustrates the use of the product of Example 3 in the preparation of a rigid polyisocyanurate-polyurethane foam. In this example, 190 w (1.0 OH equivalency) of the product of Example 3 was mixed with 60 w of Niax LA-700 (0.75 OH equivalency), 68.5 w (0.25 OH equivalency) of Vircol 82, a flame retardant phosphorus-containing polyol, 7 w of silicone surfactant, and 3 w of a trimerization catalyst and 4 w of 50% potassium acetate cocatalyst until a uniform mixture was formed. Next, 130 w of Freon 11 blowing agent were added, the mixture was agitated until a uniform blend was obtained and then the blend was vigorously agitated with 500 w of polymethylene polyphenyl diisocyanate (3.55 NCO equivalency) for 15 seconds. The resulting mixture was poured into a mold and permitted to foam. The result was a rigid polyisocyanurate-polyurethane foam having a density of 2.24 lbs.ft.$^3$, a compressive strength of 29 psi, an oxygen index of 26.6% by volume and humid aging test values, as volume % increase, of 3.7 at 24 hours, 5.0 at 7 days and 8.7 at 14 days.

EXAMPLE 10

This example illustrates the use of the product of Example 3 in combination with glycerol in the preparation of a rigid polyurethane foam.

A quantity (425 w) of the product of Example 3 was mixed with a quantity (75 w) of glycerol and allowed to stand for 48 hours. A quantity of the resulting blend (145 w, 1.5 OH equivalency) was mixed with a quantity (40 w, 0.5 OH equivalency) of Niax LA-700, a quantity (62 w, 0.5 OH equivalency) of Fyrol 6, a quantity (8 w) of a silicone surfactant, a quantity (4.5 w) of water, and a quantity (0.5 w) of Polycat 8 amine catalyst until a uniform mixture was formed. Next, a quantity (86.4 w) of Freon 11 blowing agent was blended to give a uniform mixture, following which time polymethylene polyphenyl diisocyanate (460 w, 3.28 NCO equivalency) was added to the blend, and the resulting mixture was stirred vigorously for 15 seconds. The mixture was then quickly poured into a mold and permitted to foam. The result was a rigid polyurethane foam having the following properties:

| Friability | None |
| --- | --- |
| Compressive Strength | 47 p.s.i. |
| Oxygen Index | 23.5 |
| Density | 1.9 lbs./ft.$^3$ |
| Humid Aging, vol. % Increase | |
| at 24 hours | 2.7 |
| 7 days | 4.7 |
| 14 days | 5.5 |

EXAMPLE 11

This example illustrates the use of the product of Example 3 in the preparation of a rigid polyurethane foam.

A quantity (416 w, 2.5 OH equivalency) of the product of Example 3 was mixed with a quantity (8 w) of a silicone surfactant, a quantity (4.5 w) of water, a quantity (0.5 w) of Polycat 8 amine catalyst and a quantity (1.0 w) of tin catalyst until a uniform mixture was formed. Next, a quantity (107 w) of Freon 11 blowing agent was blended to give a uniform mixture, following which time polymethylene polyphenyl diisocyanate (460 w, 3.28 NCO equivalency) was added to the blend, and the resulting mixture was stirred vigorously for 15 seconds. The mixture was then quickly poured into a mold and permitted to foam. The result was a rigid polyurethane foam having the following properties:

| Friability | None |
| --- | --- |
| Compressive Strength | 41 p.s.i. |
| Oxygen Index | 24.5 |
| Density | 2.3 lbs./ft.$^3$ |
| Humid Aging, vol. % Increase | |
| at 24 hours | 3.8 |
| 7 days | 6.3 |
| 14 days | 7.5 |

EXAMPLE 12

This example illustrates the use of a blend of the product of Example 3 in combination with glycerol as the sole polyol component in the preparation of a rigid polyurethane foam.

A quantity (425 w) of the product of Example 3 was mixed with a quantity (75 w) of glycerol and allowed to stand for 48 hours. A quantity of the resulting blend (245 w, 2.5 OH equivalency) was mixed with a quantity (8 w) of a silicone surfactant, a quantity (4.5 w) of water, a quantity (0.5 w) of Polycat 8 amine catalyst and a quantity (1.0 w) of tin catalyst until a uniform mixture was formed. Next, a quantity (85.7 w) of Freon 11 blowing agent was blended to give a uniform mixture, following which time polymethylene polyphenyl diisocyanate (460 w, 3.28 NCO equivalency) was added to the blend, and the resulting mixture was stirred vigorously for 15 seconds. The mixture was then quickly poured into a mold and permitted to foam. The result was a rigid polyurethane foam having the following properties:

| Friability | None |
| --- | --- |
| Compressive Strength | 33 p.s.i. |
| Oxygen Index | 23.8 |
| Density | 1.9 lbs./ft.$^3$ |
| Humid Aging, vol. % Increase | |
| at 24 hours | 2.6 |
| 7 days | 4.6 |
| 14 days | 6.2 |

What I claim and desire to protect by Letters Patent is:

1. The reaction product produced by reacting DMT process residue with a quantity of dipropylene glycol or a mixture thereof with up to 50% by weight of one or more different glycols, in moles, in excess of the number of equivalents of available acid and methyl ester present in said residue, as determined by the acid number and the methoxyl content of said residue.

2. The reaction product of claim 1 containing less than 25% by weight of unreacted dipropylene glycol.

* * * * *